Aug. 16, 1927.
A. B. CUNNINGHAM
1,638,984
RADIAL AVERAGING PLANIMETER
Filed Aug. 22, 1925
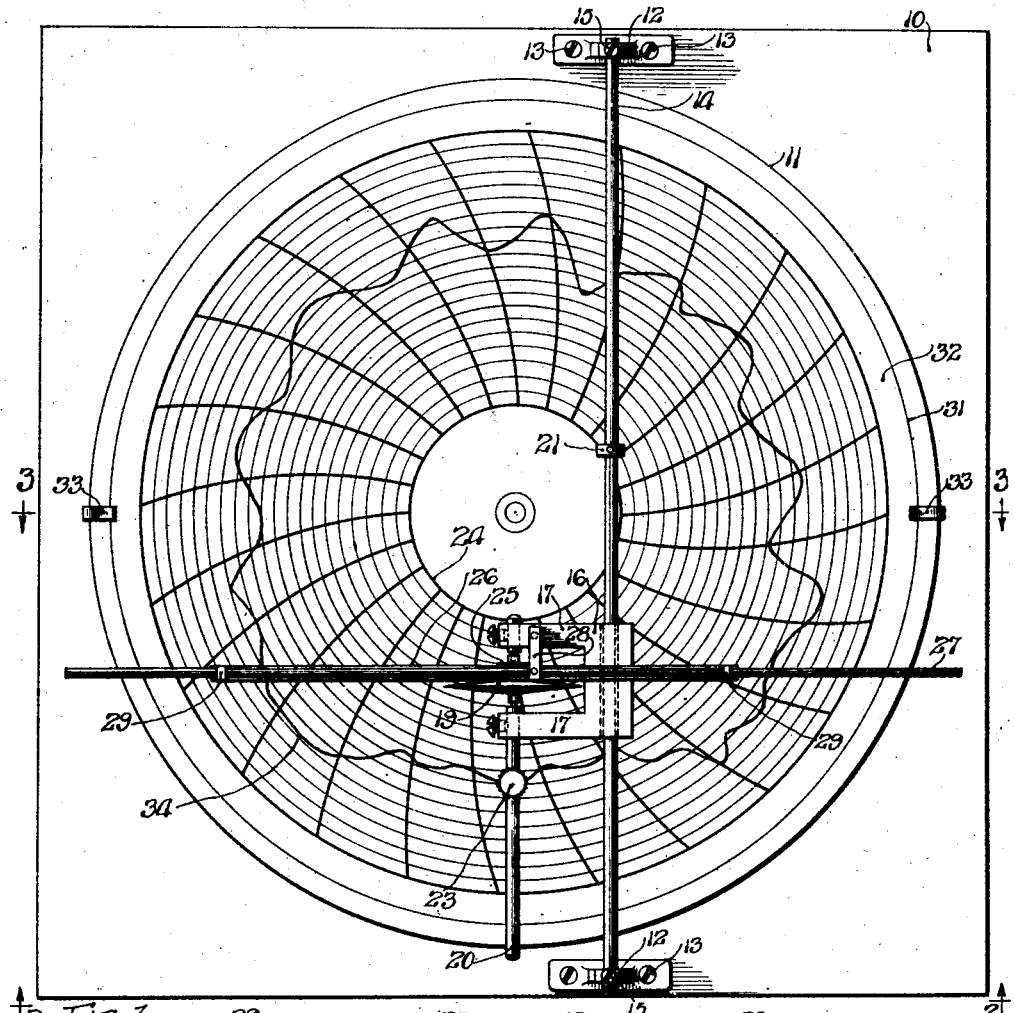
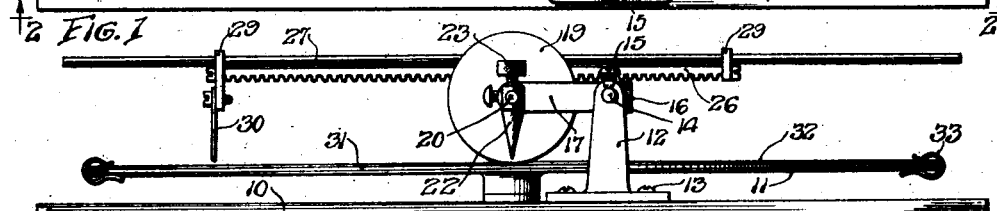
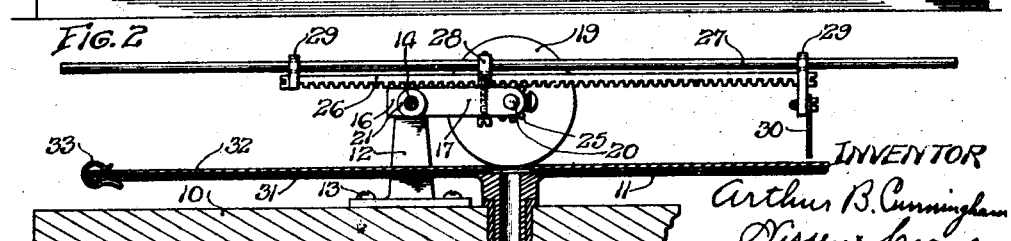
INVENTOR
Arthur B. Cunningham
BY Nissen & Crane
ATTYS.

Patented Aug. 16, 1927.

1,638,984

UNITED STATES PATENT OFFICE.

ARTHUR B. CUNNINGHAM, OF CHICAGO, ILLINOIS.

RADIAL AVERAGING PLANIMETER.

Application filed August 22, 1925. Serial No. 51,735.

This invention relates to a measuring instrument for use in connection with circular charts having lines traced thereon, and has for its object the provision of an instrument which will ascertain mechanically the radius of a circle equal in area to an irregular figure.

The invention is exemplified in the combination and arrangement of parts shown in the accompanying drawing and described in the following specification, and it is more particularly pointed out in the appended claims.

In the drawing—

Fig. 1 is a top plan view of an instrument embodying one form of the present invention;

Fig. 2 is an elevation on the line 2—2 of Fig. 1; and

Fig. 3 is a section on the line 3—3 of Fig. 1.

Many recording instruments are provided with circular charts upon which the recording pen draws a line as the chart is rotated. It is desirable in many cases to ascertain the radius of a circle having an area equal to the figure described on the chart by the recording pen, or, in other words, the average of the radii extending from the center of the chart to the irregular periphery of the figure on the chart. The present invention provides an instrument which determines this average radius mechanically.

As represented in the drawing, the numeral 10 designates a base having a turntable or disc 11 journaled centrally thereon. Supports 12 are secured to the base 10 by screws 13, the supports being arranged adjacent opposite edges of the base and in a line at one side of the pivotal axis of the disc 11. A rod or bar 14 is secured in the supports 12 by screws 15 and extends across the base 10 above the disc 11. A yoke 16 is mounted on the rod 14 and is free to move about the rod as a pivot and to slide longitudinally along the rod. The yoke 16 is provided with a pair of horizontally extending arms 17 between which there is journaled a measuring wheel or traveler 19. A rod 20 extends laterally from the yoke 16 at the side thereof opposite the center of the disc 11, the rod being in alinement with the axis of the traveler 19. A stop 21 is fixed to the rod 14 in position to arrest the movement of the yoke 16 toward the center of the disc when the point of contact between the traveler 19 and the surface of the disc is at the center of rotation of the disc. A tracing point 22 is secured to the rod 20 by means of a thumb screw 23 by which it may be secured in adjusted positions. In operation, the point of the tracer 22 is set in registration with the zero line 24 of the chart when the yoke 16 is at its innermost position with the traveler 19 tangent to the surface of the disc at the axis thereof. A pinion 25 is fixed to the traveler 19 to rotate therewith and a rack 26 meshes with the pinion 25. The rack 26 is supported and guided by a rod 27 mounted on a bracket 28 carried on the upper face of the yoke arm 17. Supporting clips 29 are secured to the ends of the rack 26 and slidably mounted on the guide rod 27. A pointer 30 is attached to the clip 29 at the forward end of the rack 26 and extends downwardly to a position adjacent the upper face of the disc 11.

The chart 31 is secured to the upper surface of the disc 11 by means of a celluloid disc 32 which is held in position on the disc 11 by clamps 33. The celluloid disc 32 covers the opening at the center of the chart and provides a smooth surface upon which the measuring wheel 19 travels.

A recording instrument pen tracing a line on a circular chart describes, regardless of the irregularity of the line, an area that may be bounded by a perfect circle, the radius of which is equal to the average length of an infinite number of radii reaching from the center of the chart to points in the periphery of the figure described by the pen. Conversely if an infinite number of points on the line described by the pen were chosen and their distances measured to the center of the chart their average distance would be equal to the radius of a perfect circle having an area equal to the area described by the recording pen. If a wheel is passed over the line described by the recording pen and the axis of the wheel is held pointing toward the center of the chart the wheel will travel over a distance equal to the circumference of a circle, the radius of which is equal to the average radial distance of the infinite number of points in the line described by the recording pen. Any point on the periphery of the wheel will, of course, travel an amount relative to the center of the wheel equal to the path over which the wheel travels, which distance will, of course, be equal to the circumference of the circle having a radius equal to the average of the infinite number of radii referred to. The ratio of the circumference of this circle to its radius is, of course, two pi.

The instrument is designed to cause the rack 26 to travel a distance equal to the radius of the circle, the circumference of which is traversed by the traveler 19. The pitch circumference of the pinion 25 must therefore have a ratio of one over two pi to the circumference of the traveler 19 and the diameter of the pitch circle of the wheel 25 will, of course, have the same ratio to the diameter of the wheel 19.

If the wheel 19 were made to travel on the line 34 on the chart shown in the drawing and the disc 11 were given a complete revolution, the pointer 30 would travel forwardly a distance equal to the average radius sought. In most charts the zero position for the needle is not at the center of the circle, but at some line 24 spaced outwardly from the center. The average distance desired therefore is not the average radius, but the average radius minus the radius of the circle 24. For this reason the traveler 19 is spaced inwardly from the pointer 22 a distance equal to the radius of the circle 24 so that the movement of the pointer 30 will equal the average radius of the irregular figure minus the radius of the circle 24.

In operation, the chart is placed beneath the celluloid disc 32 and the yoke 17 is tilted upwardly a sufficient amount to free the wheel 19 from the surface of the celluloid disc to permit ready movement of the wheel inwardly until the yoke engages the stop 21. This will bring the point of contact of the disc 29 directly over the axis of rotation of the disc 11. The pointer 30 is then set at any predetermined zero position which may conveniently be the zero circle 24. The yoke is then again tilted and without rotating the wheel 19 the yoke is moved outwardly to bring the pointer 22 into registration with the line 34. The disc 11 is then given one complete revolution while the pointer 22 is slid in and out to maintain the pointer in registration with the line 34 at all times. The yoke 17 is then again moved to its innermost position whereupon the pointer 30 will have advanced from its zero position an amount equal to the average distance between the zero line 24 and the tracing 34 which represents the average reading of the recording instrument for the period represented by the chart.

I claim:—

1. A measuring instrument having a movable member, an indicator, and a motion changing connection between said movable member and indicator for producing a movement ratio between said member and indicator, said motion changing connection having a motion ratio equal to the reciprocal of two pi.

2. The combination with means for registering the length of the circumference of a circle, of a device having a motion changing connection associated with said means the motion ratio of which is equal to the reciprocal of two pi for registering the length of the radius of said circle.

3. The combination with a device for traversing the periphery of an irregular closed figure, of means connected with said device for registering the length of the circumference of a circle having an area equal to the area of said closed figure, and means connected with said registering device and having a fixed ratio of movement relative thereto equal to the reciprocal of two pi for mechanically registering the radial length of said circle.

4. The combination with a device for traversing the periphery of an irregular closed figure, of means connected with said device for registering the length of the circumference of a circle of area equal to that of said irregular figure, an indicator, and connection between said indicator and registering device for imparting an amount of movement to said indicator having a ratio to the circumference, registered by said registering device, equal to the reciprocal of two pi.

5. The combination with a chart support, of a measuring wheel arranged to travel on said chart support about a fixed center, means for maintaining the axis of said wheel in alinement with said center, an indicator, and means for imparting movement to said indicator having a ratio to the movement of the periphery of said wheel equal to the reciprocal of two pi.

6. The combination with a support having a surface for receiving a chart, of a wheel arranged to travel on said surface, said wheel and support having relative movement about an axis perpendicular to said support, means for retaining the axis of said wheel in a line directed toward said axis of rotation, an indicator, and motion changing means between said indicator and wheel having a ratio equal to the reciprocal of two pi.

7. The combination with a support having a chart receiving surface, of a wheel arranged to travel on said surface about a fixed center spaced from said wheel in the direction of the axis thereof, means for retaining the axis of said wheel directed toward said center while permitting said wheel to move in the direction of its axis toward and away from said center, an indicator, and motion changing means connecting said indicator with said wheel for producing a ratio of movement between the periphery of said wheel and said indicator equal to the reciprocal of two pi.

8. The combination with a rotatable chart support, of a wheel arranged to travel on said support, means for retaining the axis of said wheel directed toward the axis of rotation of said support, an indicator, and motion transmitting means connecting said indicator with said wheel, said motion transmitting means having a motion changing ratio equal to the reciprocal of two pi.

9. The combination with a support, of a turntable rotatable about a fixed axis on said support, a wheel arranged to travel on said turntable, a frame for supporting said wheel with the axis thereof directed toward the axis of said turntable while permitting movement of said wheel relative to said support toward and away from the axis of said turntable, an indicator, and motion transmitting means connecting said indicator with said wheel.

10. The combination with a chart supporting turntable, of a wheel arranged to travel on said turntable, a frame for supporting said wheel with the axis thereof directed toward the axis of rotation of said turntable while permitting movement of said wheel toward and away from the axis of said turntable, a pinion driven by said wheel, a rack meshing with said pinion, and an indicator actuated by said rack.

11. The combination with a chart supporting turntable, of a wheel arranged to travel on said turntable, a frame for supporting said wheel with the axis thereof directed toward the axis of rotation of said turntable while permitting movement of said wheel toward and away from the axis of said turntable, a pinion driven by said wheel, a rack meshing with said pinion, and an indicator actuated by said rack, said rack and pinion being proportioned to produce a motion ratio between said wheel and indicator equal to a constant times pi.

12. The combination with a chart supporting turntable, of a wheel arranged to travel on said turntable, a frame for retaining the axis of said wheel directed toward the axis of rotation of said turntable while permitting movement of said wheel toward and away from the axis of said turntable, a stop for arresting the movement of said wheel with the periphery thereof engaging said turntable at the axis of rotation of said turntable, an indicator, and means connected with said wheel for imparting straight line movement to said indicator.

13. The combination with a chart support, of a wheel arranged to travel on said chart support, a frame for supporting said wheel, said frame and chart support being relatively rotatable, the axis of said wheel being directed toward the axis of relative rotation of said frame and chart support, an indicator, and means connected with said wheel for imparting straight line movement to said indicator, said connecting means being arranged to produce a ratio of motion equal to a constant times pi.

14. The combination with a chart support, of a frame disposed adjacent said chart support, a wheel journaled in said frame in position to travel on said chart support, said frame and support being relatively rotatable while the axis of said wheel remains directed toward the axis of relative rotation of said frame and chart support, an indicator, and means connected with said wheel for imparting straight line movement to said indicator, said connecting means being arranged to produce a motion ratio equal to a constant times pi.

15. An instrument having a base, a turntable rotatably mounted on said base, means for securing a chart to said turntable, a bar extending across said base above said turntable, a yoke pivotally and slidably mounted on said bar, a wheel journaled in said yoke and having the axis thereof directed toward the axis of said turntable, a pinion connected with said wheel, a rack meshing with said pinion, and an indicator carried by said rack and movable transversely to the axis of said wheel.

16. The combination with a turntable, of means for securing a chart to said turntable, a frame having a wheel journaled therein in position to travel on said turntable, said wheel being movable toward and away from the axis of said turntable while the axis of said wheel is directed toward the axis of said turntable, a pointer spaced away from said wheel and arranged in a plane passing through the axis of said wheel and vertical to the plane of said turntable, a pinion connected with said wheel, a rack meshing with said pinion, and an indicator connected with said rack.

17. An instrument having a base, a turntable rotatably mounted on said base, a rod extending transversely of said base adjacent said turntable, a yoke slidably mounted on said rod, a wheel journaled in said yoke in position to travel on said turntable, said wheel having the axis thereof directed toward the axis of said turntable, a support co-axial with said wheel and extending therefrom at the side thereof opposite the axis of said turntable, a pointer adjustably mounted on said support, a pinion connected with said wheel, a rack meshing with said pinion, and an indicator carried by said rack, the diameter of said wheel being two pi times the pitch diameter of said pinion.

In testimony whereof I have signed my name to this specification on this 18th day of August, A. D. 1925.

ARTHUR B. CUNNINGHAM.